United States Patent [19]

Garner

[11] 4,361,896
[45] Nov. 30, 1982

[54] BINARY DETECTING AND THRESHOLD CIRCUIT

[75] Inventor: Terry N. Garner, Forest, Va.

[73] Assignee: General Electric Company, Lynchburg, Va.

[21] Appl. No.: 177,488

[22] Filed: Aug. 12, 1980

Related U.S. Application Data

[63] Continuation of Ser. No. 75,153, Sep. 12, 1979.

[51] Int. Cl.³ .................... H04Q 3/02; H03K 23/00
[52] U.S. Cl. .................................. 375/96; 340/146.2; 340/146.3 WD; 455/38; 364/728
[58] Field of Search ............ 340/146.2, 146.3 T, 340/146.3 WD, 149 R; 364/514, 728; 370/92, 93, 104, 105, 106; 371/37, 41, 42, 43, 46, 47; 375/76, 108, 114, 116, 96; 455/38, 51

[56] References Cited

U.S. PATENT DOCUMENTS

| | | |
|---|---|---|
| Re. 26,104 | 11/1966 | Glauberman et al. ........... 340/146.2 |
| 2,752,489 | 3/1956 | Aigrain ................ 328/146 |
| 2,837,732 | 6/1958 | Nelson ............ 340/149 R |
| 2,848,532 | 8/1958 | Weida ................ 178/23 A |
| 2,865,567 | 12/1958 | Booth et al. ............ 235/61 |
| 2,907,003 | 9/1959 | Hobbs ................ 364/900 |
| 2,979,695 | 4/1961 | Tyrlick et al. ........... 340/149 R |
| 2,994,062 | 7/1961 | Chiapuzio, Jr. et al. ..... 340/149 R |
| 3,000,001 | 9/1961 | Brink ................ 340/149 R |
| 3,022,005 | 2/1962 | Dickinson . |
| 3,102,191 | 8/1963 | Chiapuzio, Jr. et al. ......... 235/61 R |
| 3,102,994 | 9/1963 | Stampler ............ 340/146.2 |
| 3,137,789 | 6/1964 | Chiapuzio, Jr. ............ 340/146.2 |
| 3,175,187 | 3/1965 | Willyard et al. ............ 340/146.2 |
| 3,175,191 | 3/1965 | Cohn et al. ............ 340/164 |
| 3,204,221 | 8/1965 | Sierra ................ 340/146.2 |
| 3,241,114 | 3/1966 | Zieper et al. ............ 340/146.2 |
| 3,274,379 | 9/1966 | Hinrichs ............ 364/728 |
| 3,346,844 | 10/1967 | Scott et al. ............ 340/146.2 |
| 3,366,930 | 1/1968 | Bennett et al. ............ 364/900 |
| 3,457,552 | 7/1969 | Asendorf ............ 340/146.3 T |
| 3,467,946 | 9/1969 | Stefanik ............ 340/146.2 |
| 3,493,929 | 2/1970 | Webb ............ 340/146.2 |
| 3,510,777 | 5/1970 | Gordon ............ 455/38 |
| 3,517,175 | 6/1970 | Williams . |
| 3,529,291 | 9/1970 | Brown ............ 340/146.2 |
| 3,538,316 | 11/1970 | Barrett et al. . |
| 3,541,314 | 11/1970 | Webb . |
| 3,577,186 | 5/1971 | Mitchell ............ 371/42 |
| 3,582,789 | 6/1971 | Mick ............ 375/108 |
| 3,598,979 | 8/1971 | Moreau ............ 340/146.2 |
| 3,604,911 | 9/1971 | Schmitt ............ 375/96 |
| 3,626,368 | 12/1971 | Lee ............ 340/146.3 T |
| 3,646,334 | 2/1972 | Wold ............ 235/181 |
| 3,649,758 | 3/1972 | Clark ............ 375/116 |
| 3,654,390 | 4/1972 | Puckette ............ 375/116 |
| 3,678,200 | 7/1972 | Clark ............ 370/100 |
| 3,760,355 | 9/1973 | Bruckert ............ 340/146.2 |
| 3,796,868 | 3/1974 | Kaul et al. ............ 340/146.2 |
| 3,801,956 | 4/1974 | Braun et al. ............ 340/146.2 |
| 3,908,169 | 9/1975 | Tong ............ 375/76 |
| 4,004,100 | 1/1977 | Takimoto ............ 370/106 |
| 4,022,973 | 5/1977 | Stackhouse et al. ............ 375/114 |
| 4,038,540 | 7/1977 | Roberts ............ 375/96 |
| 4,038,605 | 7/1977 | Elder et al. ............ 375/114 |

OTHER PUBLICATIONS

"Using-Time Compression Techniques in Digital Correlation", by Max Rosenbloom, Electronics, Mar. 10, 1961, pp. 191-193.

"On Computer Transcription of Manual Morse", by Charles R. Blair J. Assoc. Comp. Mach, Jul. 1959, pp. 429-442.

"Machine Recognition of Hand-Sent Morse Code", by Bernard Gold, IRE Transactions on Information Theory, Mar. 1959, pp. 17-24.

Primary Examiner—Benedict V. Safourek
Attorney, Agent, or Firm—Cushman, Darby & Cushman

[57] ABSTRACT

A repeating binary word detecting circuit produces a plurality of phase shifted samples of the logic of each binary bit forming the word. The plurality of samples are respectively compared with a stored sequence of bits forming the binary word to be detected. These comparisons are made for every possible beginning sequence of samples or stored bits between the time of two samples. An indication is given if a selected number of comparisons agree. A threshold circuit produces a decode output in response to a selected number of indications based on at least two phase shifted samples.

76 Claims, 16 Drawing Figures

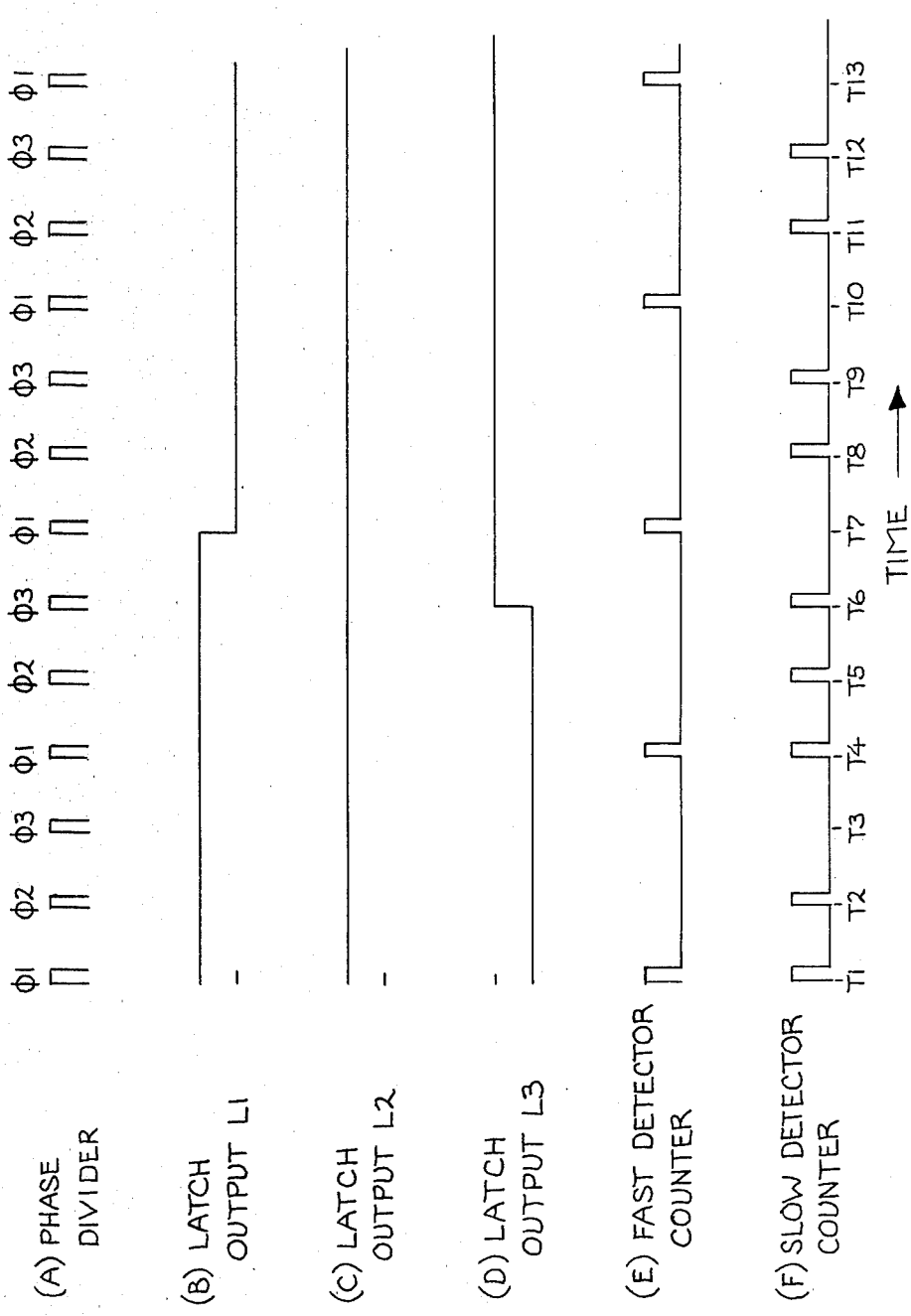

BINARY DETECTING AND THRESHOLD CIRCUIT

This is a continuation of application Ser. No. 75,153 filed Sept. 12, 1979.

BACKGROUND OF THE INVENTION

My invention relates to an improved binary detecting and threshold circuit, and particularly to such a circuit for detecting a repeated binary word without the necessity for bit synchronization.

In some radio communication systems, it may be desirable or necessary that some transmissions on a particular radio carrier frequency be heard only by a selected receiver or receivers, and that some other transmission on the same particular radio carrier frequency be heard by a different selected receiver or receivers. Such a system has been implemented by means of a continuous tone controlled squelch system, sometimes referred to as CTCSS. However, such systems have required audio tones of frequencies outside and usually below the range of the information or voice frequencies, and such frequencies are difficult to filter. For this reason, some of those systems use binary signals in which a predetermined binary word comprised of a predetermined number and arrangement of binary bits are continuously and repetitively transmitted. In such systems, only the radio receiver or receivers which are programmed to detect the predetermined binary word will be activated so that the transmission is heard.

Accordingly, a primary and general object of my invention is to provide a new and improved binary detecting circuit.

Another and more specific object of my invention is to provide a new and improved binary detecting and threshold circuit for use in radio communication systems.

Another object of my invention is to provide a new and improved binary detecting circuit that can detect binary bits relatively accurately without the necessity of providing synchronization with the desired binary bit time interval.

In such a radio communication system, the signals representing the predetermined binary word are subject to fading and distortion in the radio transmission path. When these signals are demodulated, the binary bits which are reproduced may be inaccurate, so that a decision must be made whether to activate the receiver.

Accordingly, another object of my invention is to provide a new and improved binary detecting circuit for determining the binary significance of bits which may be distorted or deformed during a radio transmission.

Another object of my invention is to provide a new and improved binary signal threshold circuit that permits the threshold to accurately reflect operating conditions in a binary signal radio communication system.

SUMMARY OF THE INVENTION

Briefly, these and other objects are achieved in accordance with my invention by an improved detecting circuit having an input for the series of binary bits forming a repeating binary word. A plurality of logic sampling means are connected to the input for producing phase shifted logic samples of each input bit at respective outputs. A shift register is respectively coupled to each of the sampling means outputs. The sampling means and shift registers are respectively arranged so that the logic samples stored in each shift register are circulated, or so that each new sample is placed in the shift register and the oldest sample is removed from the shift register. A plurality of generating means are provided for producing the predetermined binary word. Comparing means are respectively coupled to the generating means and the shift registers for comparing the binary word in the generating means with the samples in the shift registers. The shift registers are operated at a rate greater than the rate of the input binary bits, so that the binary word in the generating means can be compared with every sequence of samples in the shift register between input bits. And finally, threshold means are connected to the comparing means for producing an output signal in response to a predetermined number of proper comparisons.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1A:
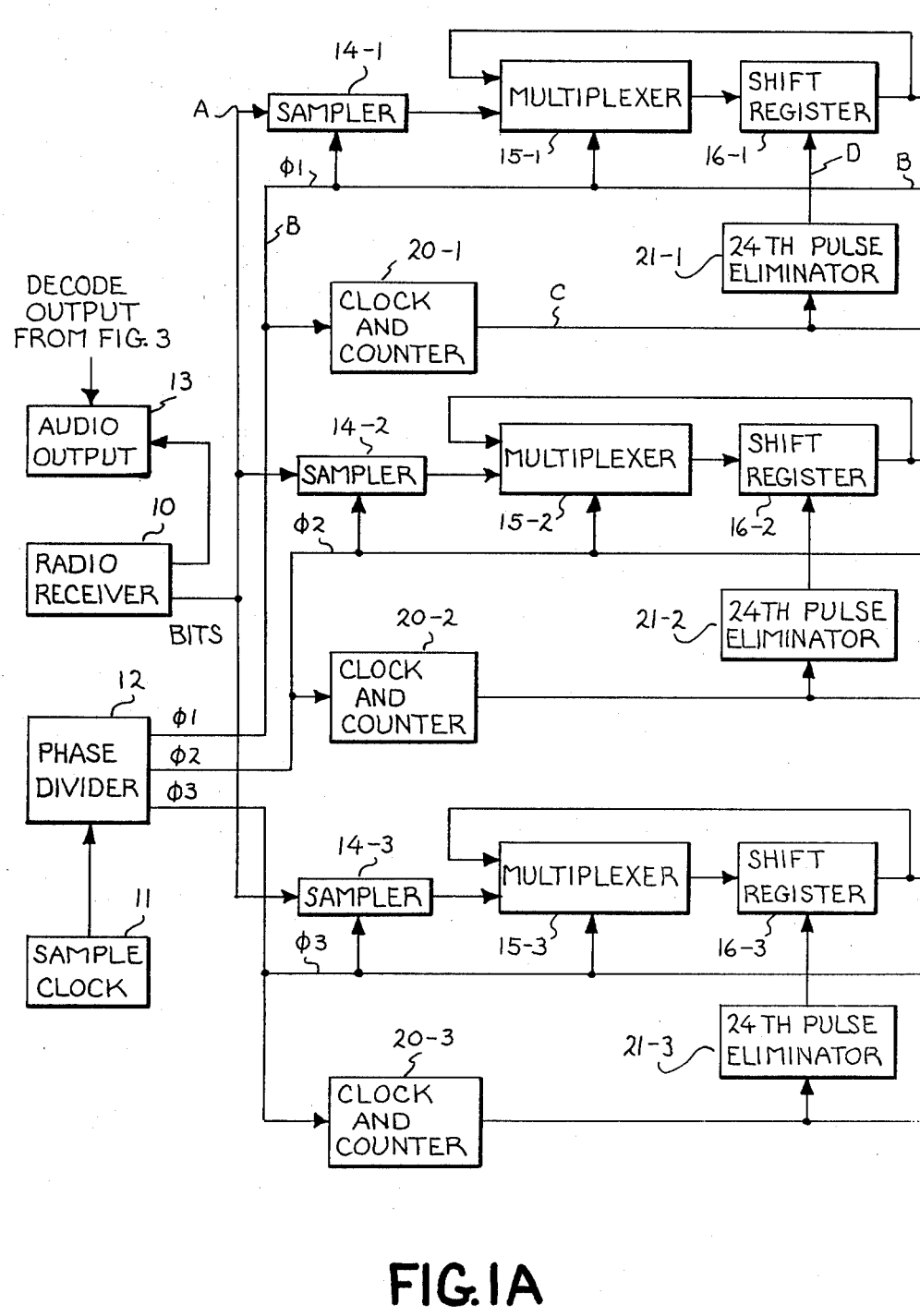
FIGS. 1A and 1B show a diagram of an improved detecting circuit in accordance with my invention.
Figure 1B:
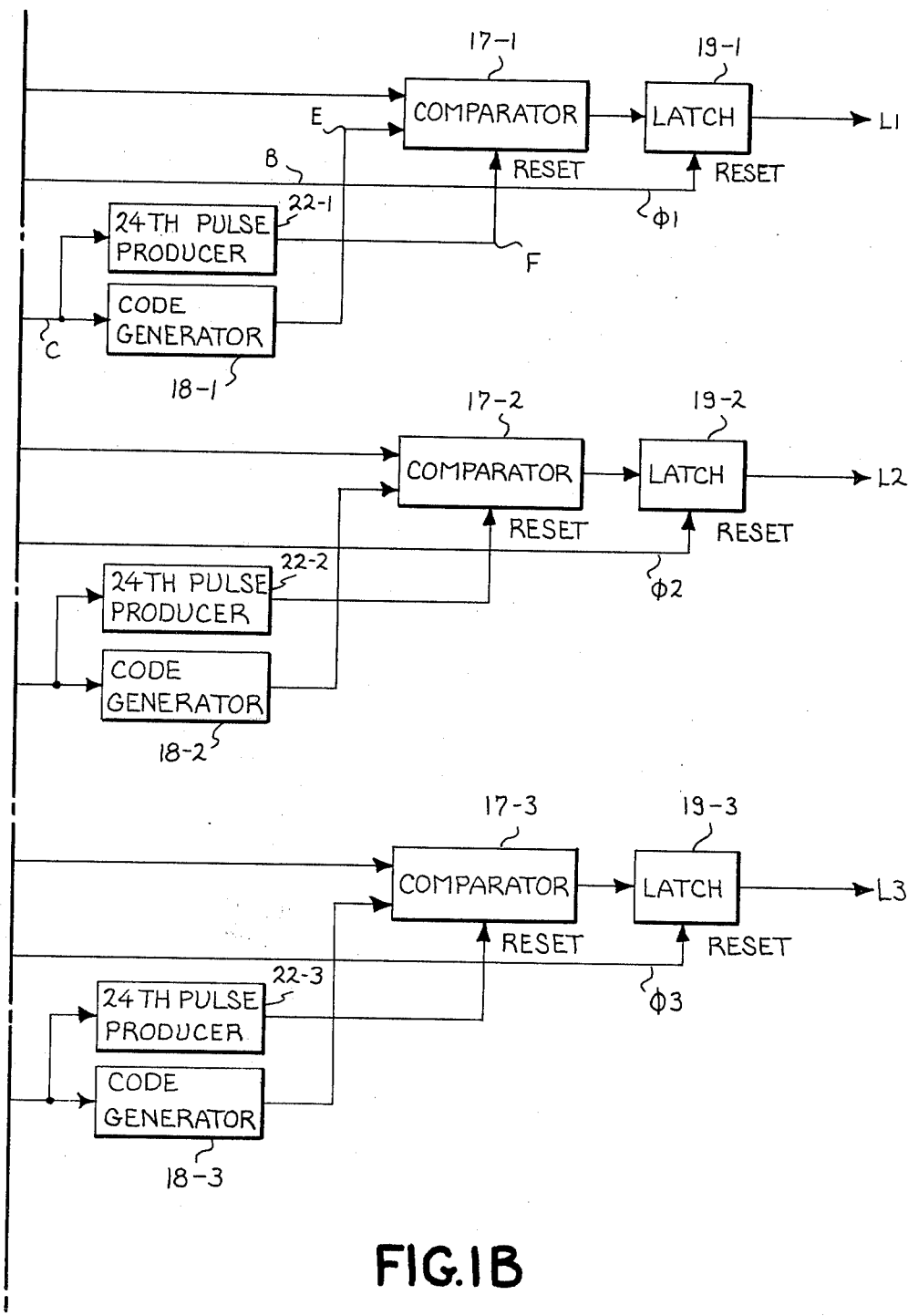

FIGS. 1A and 1B are to be considered together, with the right hand leads of FIG. 1A being connected to the respectively positioned left hand leads of FIG. 1B. As mentioned earlier, my invention is intended for use in a radio communication system in which a predetermined binary word having a plurality of binary bits is repetitively transmitted to activate or energize the output of a selected radio receiver or receivers. Since the binary bits can be used to modulate radio frequency carriers in various ways, such as amplitude or frequency modulation, I show and contemplate a radio receiver 10 which may demodulate any desired type of signals and produce these signals in appropriate form. In the receiver 10, the binary bits are produced at one output and the audio information or intelligence is produced at a second output. The two outputs are preferably filtered so as not to interfere with each other. The audio output is applied to an audio output circuit 13 which is enabled to produce an output in response to a decode signal. To provide a sufficient number of distinct binary words, I have assumed that each repeated binary word comprises 23 binary bits having logic 1's and 0's in a predetermined sequence to form a predetermined binary word. However, a word could include more or less bits. These binary bits are assumed to have a bit rate BR, which typically may be 135 bits per second. Common to my circuit is a sample clock 11 which produces pulses at a rate that is an integral multiple greater than the bit rate BR. I include a plurality of similar circuits, for example three, each of which is supplied with the received binary bits and samples them at a time that is shifted with respect to the other circuits. In the embodiment shown, I use three such circuits so that the sample clock 11 operates at a rate three times the bit rate BR. While the rate of the sample clock 11 is preferably very accurate, the actual time that each clock pulse is produced relative to the time a binary bit begins does not have to be controlled. That is, the clock pulses do not have to be synchronized with the binary bits. This sample clock 11 is connected to a phase divider 12 having three outputs, each of which produces output pulses at the bit rate BR, these pulses being time or phase shifted relative to the other pulses. Thus, the phase divider 12 produces respective short duration signals $\phi 1$, $\phi 2$ and $\phi 3$, each having a rate BR and phase relations that are preferably 120 degrees apart. It is to be understood that more or less circuits can be used, for example 2 or 4 or more such circuits. For a given plurality N, the phase divider 12 would produce N different outputs, each having a rate BR and a phase relation of 360 degrees/N with respect to the other outputs. Each output from the divider 12 is applied to a respective circuit. For the phase 1 ($\phi 1$) output, this circuit is shown horizontally across the top portion of FIGS. 1A and 1B. The phase 2 ($\phi 2$) circuit is shown horizontally across the center portion of FIGS. 1A and 1B, and the phase 3 ($\phi 3$) circuit is shown horizontally across the lower portion of FIGS. 1A and 1B. Each of these circuits is substantially similar. Corresponding circuit elements are given the same reference numeral, this numeral being followed by a suffix numeral 1, 2 or 3 which respectively indicates $\phi 1$, $\phi 2$ or $\phi 3$. For the $\phi 1$ circuit, binary data bits from the radio receiver 10 are applied to a sampler circuit 14-1. This sampler circuit 14-1 takes a sample of the binary logic of the binary data bits under the control and at the time of the $\phi 1$ signal or pulse from the phase divider 12. The samples taken are applied to a multiplexer 15-1. The multiplexer 15-1 is essentially a single pole, double throw switch having one input terminal connected to the sampler 14-1, and the other input terminal connected to the output of a shift register 16-1. The output terminal of the multiplexer 15-1 is connected to one of its input terminals under the control of the $\phi 1$ pulse from the phase divider 12. The output signals from the multiplexer 15-1 are applied to the input of the shift register 16-1. If, as assumed above, the predetermined binary word comprises 23 bits having a predetermined sequence of 1's and 0's, then the shift register 16-1 comprises 23 stages. In addition to being applied to the multiplexer 15-1, the output of the shift register 16-1 is also applied to one input of a comparator circuit 17-1. The other input for the comparator circuit 17-1 is derived from a code generator 18-1 which sequentially produces the binary bits forming the predetermined binary word. The comparator 17-1 compares the logic of the two bits applied to its inputs, and produces one output if the bit logic is the same and a different output if the bit logic is different. The comparator 17-1 may include a counter or similar circuit which, in response to a predetermined number of outputs indicating proper comparisons between bits from the shift register 16-1 and bits from the code generator 18-1, produces an output. This output is applied to a latch circuit 19-1 which produces an output L1 for a selected time period of at least the remaining time of the bit in which the comparator 17-1 produced an output, plus the time of one more bit.

Phase 1 pulses or signals from the phase divider 12 are also applied to a clock and counter circuit 20-1. This circuit 20-1 produces a stream of clock pulses at a rate higher than the bit rate BR of the $\phi 1$ pulses from the phase divider 12. For a 23 bit word, this rate is preferably at least $23 \times 24 \times$ BR, where 23 is the predetermined number of bits forming the binary word, and 24 is 23+1 to give added pulses for reasons that will be explained. For a bit rate BR of 135 bits per second, the circuit 20-1 produces pulses at a rate of $23 \times 24 \times 135$ or 74,520 pulses per second. On receipt of a $\phi 1$ signal, the circuit 20-1 produces $23 \times 24$ or 552 pulses at its output, after which no more pulses are produced until another $\phi 1$ signal is applied. The circuit 20-1 produces these 552 pulses at the 74,520 pulses per second rate in response to each $\phi 1$ signal from the phase divider 12. These counted pulses are applied to a pulse eliminator circuit 21-1 and to a pulse producer circuit 22-1. The pulse eliminator circuit 21-1 eliminates one pulse out of every 24 supplied to it, and supplies the remaining pulses to the clock input of the shift register 16-1. The pulse producer circuit 22-1 produces a single pulse in response to every 24 pulses applied to it, and supplies each of these single pulses to the reset input of the comparator 17-1. The $\phi 1$ signals are also applied for the reset input of the latch circuit 19-1.

The other portions of my circuit for phase 2 ($\phi 2$) and phase 3 ($\phi 3$) pulses or signals are similar to that described for phase 1 ($\phi 1$) signals. If more phases are used, each additional circuit would be similar. All of the circuits operate in a similar manner, but would be started at displaced time relations or phases, the exact time or phase depending on the number of phases or samples desired. For three phases, the time relation would be 120 degrees. For two phases, the time relation would be 180 degrees. These multiple phase samplings eliminate the need for any synchronization with the incoming binary data bits, and provide sufficient samples so that an accurate representation of each bit is obtained, despite any distortion or fading to which the bit may have been subjected.

Figure 2:
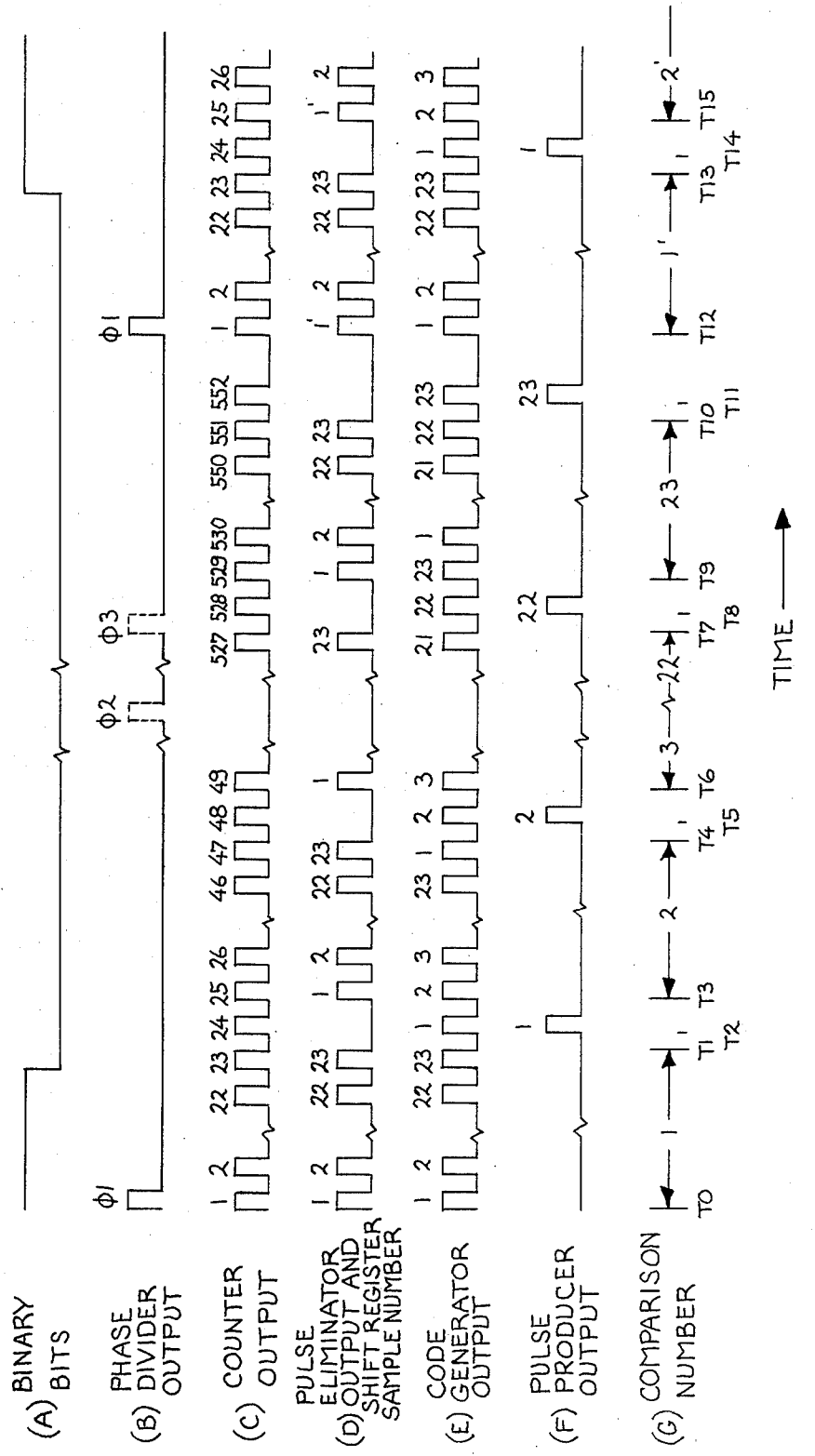
FIGS. 2A through 2G show wave forms for illustrating the operation of my detecting circuit of FIGS. 1A and 1B.

The operation of the phase 1 portion of my circuit is explained in connection with the wave forms shown in FIGS. 2A through 2G which are plotted along a common time axis. FIG. 2A shows a portion of a received binary data bit; FIG. 2B shows pulses produced by the phase divider 12; FIG. 2C shows pulses produced by the clock and counter circuit 20-1; FIG. 2D shows pulses produced by the pulse eliminator 21-1 and the bit sample number produced by the shift register 16-1; FIG. 2E shows the predetermined bit number produced by the code generator 18-1; FIG. 2F shows the pulses produced by the pulse producer 22-1; and FIG. 2G shows the time occurrence of comparisons taking place in the comparator 17-1. The locations of these waveforms are shown by corresponding letters in FIGS. 1A and 1B.

Prior to the time T0, I have assumed that the circuit has been operating long enough to have filled the shift register 16-1 with bit samples. At the time T0, I assume that the phase divider 12 produces a $\phi 1$ pulse shown in FIG. 2B. This $\phi 1$ pulse does several things. It causes the sampler 14-1 to take a binary sample of the binary bit being received, and also causes the multiplexer 15-1 to switch its input from the shift register output to the sampler output so that the binary sample is applied to the shift register 16-1 at this time. If, as assumed, the shift register 16-1 is full, this latest sample replaces the oldest sample because the timing in the shift register 16-1 is under control of the φ1 pulses. The φ1 pulse causes the counter 20-1 to begin producing the counted stream of 23×24 or 552 pulses shown in FIG. 2C. These counted pulses cause the code generator 18-1 to begin producing the sequence of predetermined binary bits forming the binary word. The sequence output of these bits is shown in FIG. 2E. These same counted pulses are also applied to the pulse eliminator 21-1 and to the pulse producer circuit 22-1. The pulse eliminator 21-1 eliminates every 24th pulse as shown in FIG. 2D, and the pulse producer circuit 22-1 produces a single pulse every 24 pulses, as shown in FIG. 2F. In comparison 1 indicated between the times T0 and T1 in FIG. 2G, bit samples 1 through 23 produced by the shift register 16-1 (as shown by the numbers in FIG. 2D) are respectively compared with the predetermined code bits 1 through 23 produced by the generator 18-1 (as shown by the numbers in FIG. 2E) in the comparator 17-1. Samples 3 through 21 and code bits 3 through 21 are omitted to save space. If a predetermined number of comparisons are proper, that is if binary 1's or 0's from the shift register 16-1 occur at the same time as binary 1's or 0's from the code generator 18-1, the comparator 17-1 produces an output that causes the latch circuit 19-1 to latch and produce an output L1. This predetermined number of proper comparisons may have any value, although I prefer 21. After comparison 1 is completed, and at the time T2, counter pulse 24 is eliminated from the shift register 16-1. However, this pulse 24 is supplied to the code generator 18-1, so that predetermined code bit 1 is still produced even though no new bit sample is produced by the shift register 16-1. This pulse 24 is also supplied to the pulse producer 22-1 which produces a pulse 1 (FIG. 2F) that resets the count in the comparator 17-1 to zero. This count reset eliminates any ambiguity or error which might result from bit sample 23 (produced by the shift register 16-1) being compared with code bit 1 (produced by the code generator 18-1) at the time T2. At the time T3, the counter 20-1 produces pulse 25 to start comparison 2. This pulse 25 is produced as pulse 1 by the pulse eliminator 21-1, and causes the shift register 16-1 to produce bit sample 1. This pulse 1 also causes the code generator 18-1 to produce code bit 2, since code bit 1 was produced in response to pulse 24. During comparison 2, bit sample 1 is compared with code bit 2, bit sample 2 is compared with code bit 3, and so on until bit sample 22 is compared with code bit 23, and bit sample 23 is compared with code bit 1. Thus in comparison 2, the bit number forming the predetermined code and the bit numbers of the samples are shifted with respect to each other after comparison 1. Comparison 2 ends at the time T4. At the time T5, counter pulse 48 is eliminated so that shift register pulse 23 remains. Also, pulse producer pulse 2 is produced to reset the comparator 17-1. At the time T6, counter pulse 49 starts the third comparison of bit sample 1 and code bit 3, and so on. This operation continues on for additional comparisons through comparison 22 which ends at the time T7. Between the times T6 and T7, similar operations begin with phase divider pulses φ2 and φ3 and the remainder of the circuits of FIGS. 1A and 1B. At the time T8, counter pulse 528 is eliminated, and pulse producer pulse 22 is produced to reset the comparator 17-1. At the time T9, counter pulse 529 starts the 23rd comparison of bit sample 1 and code bit 23, and so on ending with bit sample 23 and code bit 22 at the time T10. At this time T10, 551 counter pulses have been used, and every possible predetermined code bit sequence, each beginning with a different code bit but in the same predetermined order, has been compared with the same sequence of bit samples in the shift register 16-1. Since 23 bits form a binary word, there are 23 different bits that the sequence can start with. Consequently, all 23 comparisons must be made in the time of one binary bit. While each of the comparisons described above started with a different code bit but the same bit sample, it will be appreciated that each comparison could have started with a different bit sample but the same code bit. As shown in FIG. 2D, comparison 1 begins with bit sample 1 and code bit 1; comparison 2 begins with bit sample 1 and code bit 2; comparison 3 begins with bit sample 1 and code bit 3; and so on to comparison 22 which begins with bit sample 1 and code bit 22; and finally comparison 23 which begins with bit sample 1 and code bit 23. At the time T11, counter pulse 552 (the last of a clock sequence) is produced. This pulse 552 causes the pulse producer 22-1 to produce pulse 23 which resets the comparator 19-1. After this time bit sample 1 is at the output of the shift register 16-1, and code bit 1 is at the output of the code generator 18-1.

During comparisons 1 through 23 each of the pulse producer pulses 1 through 23 resets the comparator 17-1, so that the count in the comparator 17-1 can start over for each comparison sequence. Actually, only one sequence out of the 23 sequences should or will be correct. For that correct sequence, 23 correct comparisons should be made by the comparator 17-1. Hence, any reasonable count or threshold, such as 20 or 21, in the comparator 17-1 may be required for the comparator 17-1 to produce an output. This output can be used to set the latch 19-1 to provide a high output L1 indicating proper comparison. If, after a reset, 20 or 21 correct bit comparisons are made in a sequence, the chances are great that all bit comparisons in that same sequence will also be correct. Persons skilled in the art will appreciate the relative merits of having a high threshold in the comparator for accuracy, as opposed to a low threshold in the comparator in order to produce a rapid output so that the receiver or other device is activated or energized.

At the time T12, another phase divider φ1 pulse is produced. This causes the sampler 14-1 to sample the logic of the binary bit being received, and causes the multiplexer 15-1 to connect the shift register input to the sampler 14-1 and receive the new bit sample 1' in the place of the old bit sample 1. The logic of the other bit samples 2 through 23 remain the same. This φ1 pulse resets the latch 19-1, and starts the clock and counter 20-1 to produce another 552 pulses that produce 23 comparisons as described above. φ2 and φ3 pulses are also produced to cause their respective circuits to function in the same way. However, as mentioned earlier, the respective phases 2 and 3 are operated at 120 degree relationships with each other and with respect to phase 1. Thus, with multiple sampling of each binary bit at multiple phase relations, the logic samples of the binary bits will be averaged or corrected. If any one or more latch outputs are produced, an indication can be provided to a receiver or other device that the proper binary word is present, and this indication can be used to enable the output circuit 13 of the receiver 10, and provide a listener with the received intelligence or other information. However, in applications where a more accurate way is needed to determine when a receiver should be activated, I prefer to use a threshold circuit such as described below.

THRESHOLD CIRCUIT

Figure 3:
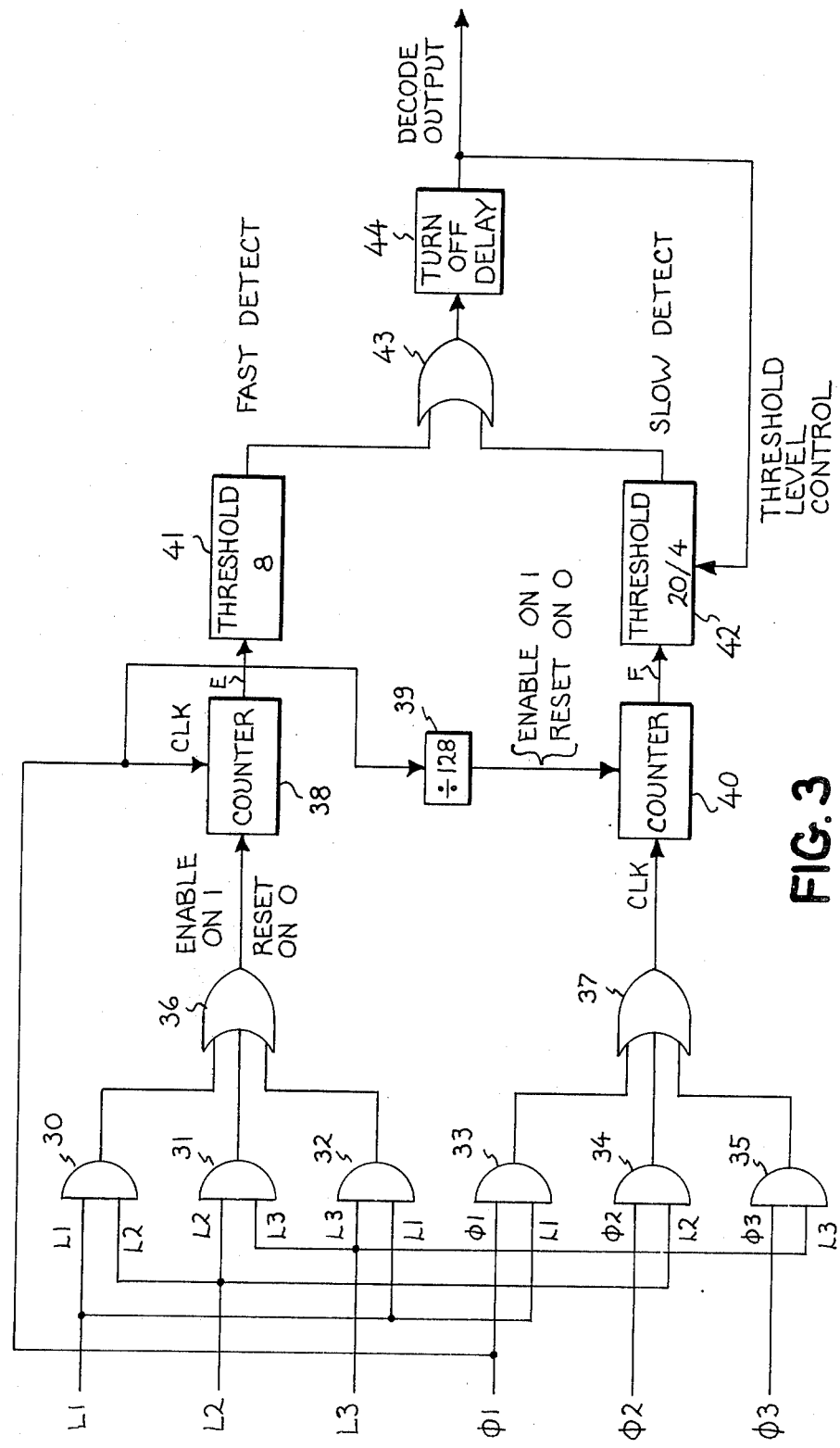
FIG. 3 shows a diagram of an improved threshold circuit in accordance with my invention for use with my detecting circuit of FIGS. 1A and 1B, and FIGS. 4A through 4F show wave forms for illustrating the operation of my threshold circuit of FIG. 3.

FIG. 3 shows a circuit diagram of a preferred threshold circuit in accordance with my invention for use with my detecting circuit of FIGS. 1A and 1B. My threshold circuit utilizes a plurality of two input AND gates 30 and 35. The inputs of gate 30 are coupled to latch circuits 19-1, 19-2; the inputs of gate 31 are coupled to latch circuits 19-2, 19-3; and the inputs to gate 32 are coupled to latch circuits 19-3, 19-1. The outputs of these AND gates 30, 31, 32 are coupled to a three input OR gate 36. The output of the OR gate 36 is applied to the enable input of a counter 38 which is clocked by the $\phi 1$ pulse. The output of the counter 38 is applied to a threshold circuit 41 which produces an output in response to a predetermined count, for example 8. This part of the circuit forms a fast detect circuit. The output of the threshold circuit 41 is applied to one input of an OR gate 43. The output of the OR gate 43 is applied to a turn-off delay circuit 44 which produces a decode signal in response to an output from the OR gate 43, and continues to produce this decode signal for a predetermined time period following removal of the output from the OR gate 43.

My threshold detect circuit also includes a slow detection circuit. In this part of the circuit, the AND gates are connected to the phase divider 12 and the latches 19-1, 19-2, 19-3, so that AND gate 33 receives the $\phi 1$ and L1 signals; AND gate 34 receives the $\phi 2$ and L2 signals; and AND gate 35 receives the $\phi 3$ and L3 signals. The outputs of these AND gates 33, 34, 35 are applied to an OR gate 37 which provides a clocking signal to a counter 40. This counter 40 is enabled as long as an enabling signal is supplied from a divide-by-128 circuit 39. The circuit 39 counts the $\phi 1$ signals, and produces an enabling signal until a count of 128 is reached, after which it produces a reset signal. As soon as another $\phi 1$ signal is received, the divider 39 produces an enabling signal again for another 128 $\phi 1$ signals. The output of the counter 40 is applied to a threshold circuit having two levels of 20 and 4 as will be explained. If, as the case may be, an appropriate count is received, the threshold circuit 42 produces an output which is supplied to the OR gate 43. The threshold circuit 42 requires a count of 20 if a decode signal is not produced. As soon as a decode signal is produced, the required threshold count is reduced to 4. Thus, if a decode signal is lost, the slow detect threshold circuit 42 requires a count of 20 before providing an enabling signal to the OR gate 43. Once a decode signal is produced, the slow detect threshold circuit 42 requires a count of 4, so that a decode signal will continue to be produced if the counter 40 produces 4 outputs before the counter 40 is reset. As should now be appreciated, this type of feedback connection provides hysteresis in the thresholded output which prevents loss thereof (once acquired) in relatively lower signal-to-noise environments than otherwise possible.

The operation of my threshold circuit of FIG. 3 will be explained in connection with the wave form shown in FIGS. 4A through 4F, plotted along a common time axis. FIG. 4A shows the $\phi 1$, $\phi 2$, $\phi 3$ signals produced by the divider 12 of FIG. 1A. FIGS. 4B, 4C and 4D show assumed output latch signals L1, L2, L3 for the latch circuits 19-1, 19-2 and 19-3 of FIG. 1B. FIG. 4E shows the count outputs produced by the fast counter 38, and FIG. 4F shows the outputs produced by the slow counter 40.

Just prior to the time T1, it is assumed that the latch signals L1, L2 are high, (indicating that the $\phi 1$ and $\phi 2$ bit samples agree with the predetermined bit code), and that the latch signal L3 is low (indicating that the $\phi 3$ bit samples disagree with the predetermined bit code). When the $\phi 1$ signal appears at the time T1, the AND gate 30 is producing a logic 1 which is passed by the OR gate 36 to enable the fast counter 38 to produce a count of the $\phi 1$ clock pulse as shown in FIG. 4E. Also, a logic 1 at L1 allows AND gate 33 to pass a $\phi 1$ clock pulse which is, in turn passed by OR gate 37 to cause the slow counter 40 to produce a count as shown in FIG. 4F. At the time T2, the fast counter 38 does not produce an output even though enabled, since no $\phi 1$ clock signal is applied to the counter 38. However, the slow counter 40 does produce an output since the $\phi 2$ signal and the latch signal L2 are high to cause the gate 34 to produce an output. At the time T3, the fast counter 38 produces no output since no $\phi 1$ clock signal is applied to the fast counter 38. The slow counter 40 produces no output, since the latch signal L3 is assumed to be low at the time of the $\phi 3$ signal. At the time T4, both the fast and slow counters 38, 40 produce a count signal for the same conditions which existed at the time T1. A slow count is produced at the time T5 as at the time T2.

At time T6, a slow count signal is produced since the latch signal L3 is assumed to have become high before the $\phi 3$ signal is produced. No fast count is produced because no $\phi 1$ signal is present. With respect to the time T7, I have assumed that the comparator 17-1 does not produce an output after the time T3 and before the time T4, so that the latch 19-1 produces a low L1 output at the time T7. Hence, the slow counter 40 does not produce a count at the time T7. The fast counter 38 does produce a count at the time T7 because of the high latch signals L2 and L3.

At the time T8, the slow counter 40 produces a count because the $\phi 2$ signal and high latch signal L2 are present. No fast count is produced, since the $\phi 1$ signal is not present. At the time T9, the slow counter 40 produces an output because of the $\phi 3$ signal and the high latch signal L3. No fast count is produced, since the $\phi 1$ signal is not present. At the time T10, the fast counter 38 produces a count in response to the $\phi 1$ clock signal and the high latch signals L2, L3. No slow count is produced since the latch signal L1 is low. At the time T11, the slow counter 40 produces a count in response to the $\phi 2$ signal and the high latch signal L2. No fast count is produced, since the $\phi 1$ signal is not present. At the time T12, the slow counter 40 produces a count in response to the $\phi 3$ and high L3 signals. And, at the time T13, the fast counter 38 produces a count in response to the $\phi 1$ signal and the high latch signals L2, L3. Other conditions are also possible. But if 8 fast counts or 20 slow counts are produced, a decode signal is produced to enable the audio output circuit 13 of the receiver 10.

This threshold circuit is ideal for radio receiving conditions, and provides the best balance and selection between fast operation for rapid receiver activation on the one hand, and for reliability under fading or adverse conditions on the other.

It will thus be seen that I have provided a new and improved detecting circuit and threshold circuit. While I have shown only one embodiment of my circuit, persons skilled in the art will appreciate the modifications that may be made. In particular, my detecting circuit may use any number of phase signals, depending upon design preference. However, I feel that three equally spaced phase signals provide an optimum choice. Similarly, in my threshold circuit, either the fast threshold circuit or the slow threshold circuit could be omitted. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved circuit for detecting the information contained in each binary signal in a sequence of binary input signals comprising:
   a. first means for producing a plurality of separate sequences of binary signals from said sequence of input binary signals, each binary signal of each separate sequence being substantially equally spaced in time relative to the other corresponding binary signals of the other separate sequences;
   b. a plurality of second means for storage, each of said second storage means being connected to said first producing means for storing a predetermined number of binary signals of each of said separate sequences respectively;
   c. third storage means for storing a predetermined desired number and sequence of binary signals;
   d. a plurality of comparing means, each of said comparing means being connected to said third storage means and being connected to a respective one of said second storage means for comparing binary signals in its respective second storage means with said predetermined desired sequence in said third storage means and producing an output signal indicative of said comparison,
   e. and means connected to one of said storage means for causing the signals therein to be shifted by one so that the next subsequent comparison is started with a different signal from said one storage means.

2. The improved circuit of claim 1 wherein said comparing means compare said binary signals serially.

3. The improved circuit of claim 1 or claim 2 wherein said means for shifting stops said one storage means for the time interval of one signal stored therein.

4. The improved circuit of claim 3 wherein a comparison is made for every possible different starting signal in the time period of one binary input signal.

5. An improved circuit for detecting a repeating binary word, each repeated word comprising a series of input binary bits of predetermined number and logic, said improved circuit comprising:
   a. an input for said series of binary bits;
   b. a plurality of sampling means connected to said input, each of said sampling means producing a binary sample of each input bit at its respective output, said binary samples being phase shifted relative to each other;
   c. a plurality of shift register devices each capable of storing said predetermined number of binary samples comprised by said predetermined binary word;
   d. first means connecting one of said shift register devices to a respective one of said sampling means outputs for selectively causing said shift register devices to circulate said binary samples stored therein or to receive a new binary sample and remove the oldest binary sample therefrom;
   e. a plurality of generating means for generating the series of binary bits comprised by said binary word;
   f. a plurality of comparing means;
   g. second means connecting each of said comparing means to a respective one of said generating means and to a respective one of said shift register devices for comparing said generated bits from said generating means with said binary samples in said shift register devices;
   h. a plurality of control means for producing control pulses at a rate greater than the rate of said input binary bits, said control rate being determined in part by said predetermined number of binary bits forming said binary word;
   i. third means connecting one of said control means to a respective one of said shift register devices and to a respective one of said generating means for causing said shift register devices to produce said binary samples and for causing said generating means to produce said generated bits;
   j. and output means connected to said comparing means for producing an output signal in response to a comparison that exceeds a predetermined agreement between said binary samples stored in a respective shift register device and said generated bits produced by said generating means.

6. The improved circuit of claim 5 wherein each of said control means causes its respective shift register device and its respective generating means to shift the relation of said binary samples and said generated bits after one comparison so that the next comparison begins with a different relation of said binary samples and said generated bits.

7. The improved circuit of claim 6 wherein each of said control means pulse rates is sufficiently high to permit all the different comparison relations to be made between the time of each binary sample and the next succeeding binary sample.

8. The improved circuit of claim 5, or claim 6, or claim 7 wherein said comparing means serially compare said generated bits with said binary samples.

9. The improved circuit of claim 5, or claim 6, or claim 7 wherein said input binary bits have a rate BR, wherein said binary word comprises N bits, and wherein said control means pulse rates are at least $N^2$ times BR.

10. The improved circuit of claim 5, or claim 6, or claim 7 wherein each of said third means includes means for eliminating every (N+1) bit connected to either said shift register devices or to said generating means, where N is the number of binary bits forming said binary word.

11. The improved circuit of claim 10 wherein said input binary bits have a rate BR, and wherein said control means pulse rates are N times (N+1) times BR.

12. The improved circuit of claim 10 wherein each of said control means is connected to a respective one of said sampling means for producing N times (N+1) control pulses in response to each respective sampling, and prior to the next succeeding sampling.

13. An improved radio receiver for use in a system wherein information signals and a repeating binary word are transmitted, each repeated word comprising a series of input binary bits of predetermined number and logic, said improved radio receiver comprising:
   a. means for detecting and demodulating said transmitted radio signals;
   b. a first output connected to said detecting and demodulating means for said information signals;

c. a second output connected to said detecting and demodulation means for said binary bits;

d. means connected to said first output for enabling said information signals to be produced at said first output in response to a decode signal;

e. a plurality of sampling means connected to said second output, each of said sampling means producing a binary sample of each input bit at its respective output, said binary samples being phase shifted relative to each other;

f. a plurality of shift register devices each capable of storing said predetermined number of binary samples comprised by said predetermined binary word;

g. first means connecting one of said shift register devices to a respective one of said sampling means outputs for selectively causing said shift register devices to circulate said binary samples stored therein or to receive a new binary sample and remove the oldest binary sample therefrom;

h. a plurality of generating means for generating the series of binary bits comprised by said binary word;

i. a plurality of comparing means;

j. second means connecting each of said comparing means to a respective one of said generating means and to a respective one of said shift register devices for serially comparing said generated bit from said generating means with said binary samples in said shift register devices;

k. a plurality of control means for producing control pulses at a rate greater than the rate of said input binary bits, said control rate being determined in part by said predetermined number of binary bits forming said binary word;

l. third means connecting one of said control means to a respective one of said shift register devices and to a respective one of said generating means for causing said shift register devices to produce said binary samples and for causing said generating means to produce said generated bits;

m. output means connected to said comparing means for producing a decode signal in response to a comparison that exceeds a predetermined agreement between said binary samples stored in a respective shift register device and said generated bits produced by said generating means;

n. and means connecting said output means to said enabling means.

14. An improved threshold circuit for use with a binary detecting circuit having a predetermined plurality N of detector outputs respectively representing phase shifted samples of a predetermined binary word, said samples being taken in response to N respective sample signals, said improved threshold circuit comprising:

a. a first plurality of AND gates each having two inputs for respective connection to two different ones of said detector outputs;

b. a first OR gate having said first plurality of inputs respectively connected to the outputs of said first AND gates;

c. a first counter connected to the output of said first OR gate;

d. a first threshold circuit connected to the output of said first counter;

e. a second plurality of AND gates each having two inputs for respective connection to corresponding detector outputs and sample signals;

f. a second OR gate having said second plurality of inputs respectively connected to the outputs of said second AND gates;

g. a second counter connected to the output of said second OR gate;

h. a second threshold circuit connected to the output of said second counter;

i. and means connected to said threshold circuits for producing a decode output signal in response to an output signal from either of said threshold circuits.

15. The improved threshold circuit of claim 14 wherein said second counter is reset to zero in response to a predetermined number of said sample signals.

16. A threshold circuit for use with N output circuits, each of which produces an output signal indicative of the characteristic of an input signal at a time determined by a respective sampling signal produced by a sampling circuit, where N is any integer greater than 1, said threshold circuit comprising:

a. first means coupled to said output circuits for producing a first signal in response to any two of said output signals having a predetermined indication at the same time;

b. second means coupled to said first means for counting each of said first signals and producing a threshold signal in response to the count in said second means exceeding a predetermined magnitude;

c. third means coupled to said output circuits and to said sampling circuits for producing a second signal in response to any one of said output signals having said predetermined indication at the same time as the occurrence of the sampling signal for that output circuit;

d. and fourth means coupled to said third means for counting each of said second signals and producing a threshold signal in response to the count in said fourth means exceeding a predetermined magnitude.

17. The threshold circuit of claim 16 wherein said fourth means produce said threshold signal in response to the count in said fourth means exceeding a predetermined magnitude during a predetermined number of said sampling signals.

18. The threshold circuit of claim 17 wherein the count in said fourth means is reset to zero after each of said predetermined number of said sampling signals.

19. A digital correlation circuit for detecting a predetermined digital word of binary-valued bits within an incoming serial bit stream, said correlation circuit comprising:

plural comparison circuits connected in parallel to independently compare a sequence of binary-valued signals corresponding to a portion of said incoming serial bit stream with the bit values of said predetermined digital word, each comparison circuit providing a respectively corresponding successful independent comparison output in response to a predetermined detected degree of correlation between said compared binary values; and a threshold logic circuit connected to receive all said independent comparison outputs and to produce a thresholded output in response to receipt of a predetermined number of said independent comparison outputs indicating the presence of said predetermined detected degree of correlation in respectively corresponding ones of said plural comparison circuits.

20. A digital correlation circuit as in claim 19 wherein said threshold logic circuit includes logic circuitry connected to detect the occurrence of pairs of said successful independent comparison outputs and to produce said thresholded output in response to receipt of a predetermined first number of pairs of successful independent comparison output signals.

21. A digital correlation circuit as in claim 20 wherein each of said pairs of comparison output signals comprise such signals which occur substantially simultaneously from at least two of said comparison circuits.

22. A digital correlation circuit as in claim 20 wherein said threshold logic circuit includes logic circuitry connected to produce said thresholded output in response to receipt of a predetermined second number of pairs of successful independent comparison output signals.

23. A digital correlation circuit as in claim 22 wherein said second number is greater than said first number.

24. A digital correlation circuit as in claim 22 or 23 wherein said threshold logic circuit includes a feedback connection from said thresholded output back to said threshold logic circuit effective to change at least one of said predetermined numbers to a lower value in response to said threshold logic circuit output thereby reducing the number of comparison output signals required to maintain said thresholded output after its initial occurrence.

25. A digital correlation circuit as in claim 19, 20, 21, 22 or 23 wherein each of said plural comparison circuits include means for performing said word comparison at least once each time another incoming bit is received.

26. A digital correlation circuit as in claim 19, 20, 21, 22 or 23 wherein each of said plural comparison circuits includes means for performing a number N of said word comparisons each time another incoming bit is received, N being at least equal to the number of bits in said predetermined digital word, and successive ones of the N word comparisons being performed after a relative shift in the bit-to-bit alignment between the words to be compared such that all possible sequences of bit values in said portion of the incoming bit stream are compared with said predetermined word between receipt of successive incoming bits.

27. A digital correlation circuit for detecting a repeating predetermined digital word of binary valued bits within an incoming serial bit stream, said correlation circuit comprising:
a word comparison circuit connected to initially compare binary-valued signals corresponding to a word-length portion of said incoming bit stream with the bit values of said predetermined word and to provide an output signal in response to a first predetermined number of acceptable word comparisons including means for alternatively, in response to a control signal at a control input, providing said output signal in response to a second predetermined number of acceptable word comparisons, said second number being less than said first number, and
a feedback connection from said output signal to said control input of the word comparison circuit to thereby reduce the number of acceptable word comparisons required to maintain said output signal after its initial occurrence.

28. A digital correlation circuit for detecting a repeating predetermined digital word of binary-valued bits within an incoming serial bit stream, said correlation circuit comprising:

a word comparison circuit connected to compare binary-valued signals corresponding to a word-length portion of said incoming bit stream with the respectively corresponding bit values of said predetermined word and to provide an output signal in response to a predetermined plural number of acceptable word comparisons,
a clock circuit connected to drive said word comparison circuit to perform said word comparisons at a rate which is approximately N-times higher than the bit-rate of incoming bits, N being at least equal to the number of bits in said predetermined word, and
a shifting circuit included in said word comparison circuit for shifting the bits of one compared word relative to those of another compared word between successive word comparisons.

29. A correlation circuit for reliably asynchronously detecting a repeating predetermined digital word of binary-valued bits within an incoming serial bit stream signal, said correlation circuit comprising:
plural digital word comparison circuits, each connected in parallel to independently receive a respectively corresponding relatively phase-shifted sequence of bit-stream signal samples, to independently compare said samples with the bits of said predetermined digital word and to independently provide respectively corresponding successful comparison outputs in response to a predetermined detected degree of correlation therebetween, and
a threshold circuit connected to receive said successful comparison outputs from all said comparison circuits and to produce a thresholded output in response to receipt of a predetermined number of said successful comparison outputs.

30. A correlation circuit as in claim 29 wherein said threshold circuit includes a fast detect circuit for detecting the occurrence of a pair of said successful comparison outputs and connected to produce said thresholded output in response to receipt of a predetermined first number of pairs of said successful comparison output signals.

31. A correlation circuit as in claim 30 wherein said threshold circuit includes a slow detect circuit for detecting the occurrence of a pair of said successful comparison outputs and connected to produce said thresholded output in response to receipt of a predetermined second number of pairs of comparison output signals.

32. A correlation circuit as in claim 31 wherein said slow detect means and said fast detect means are alternatively operable in response to a control input and wherein said threshold circuit includes a feedback connection from its threshold output to said control input effective to thereby reduce the number of comparison output signals required to maintain said threshold circuit output after its initial occurrence.

33. A correlation circuit as in claim 29 wherein said threshold circuit includes a feedback connection from said threshold output back to said threshold circuit effective to change said predetermined number to a lower value thereby reducing the number of comparison output signals required to maintain said threshold circuit output after its initial occurrence.

34. A correlation circuit as in claim 29 wherein each of said digital comparison circuits includes:
means for causing said word comparisons to occur at a rate approximately equal to N-times the bit rate of incoming bits, N being at least equal to the number of bits in said predetermined word; and means for shifting the bits of one compared word relative to those of another compared word between successive word comparisons.

35. A circuit for asynchronously detecting a predetermined sequence of serially received binary-valued signals occurring at a predetermined nominal bit rate, said circuit comprising:

first circuit means for sampling said signals at a first sequence of times, for storing a first digital word of binary-valued bits representing a predetermined number of sampled values of said signals, for comparing the binary-valued bits of said first digital word with a predetermined digital word of binary-valued bits, and for producing a first comparison output signal in response to a predetermined degree of detected correlation between said first and said predetermined digital words;

second circuit means for sampling said signals at a second sequence of times different than said first sequence of times, for storing a second digital word of binary-valued bits representing a predetermined number of sampled values of said signals, for comparing the binary-valued bits of said second digital word with said predetermined digital word of binary-valued bits, and for producing a second comparison output signal in response to a predetermined degree of detected correlation between said second and said predetermined digital words; and threshold circuit means connected to receive said first and second comparison output signals and to produce an output signal in response to receipt of a predetermined minimum number of said comparison output signals.

36. A circuit as in claim 35 further comprising:

third circuit means for sampling said signals at a third sequence of times different than said first and second sequences of times, for storing a third digital word of binary-valued bits representing a predetermined number of sampled values of said signals, for comparing the binary-valued bits of said third digital word with said predetermined digital word of binary-valued bits, and for producing a third comparison output signal in response to a predetermined degree of detected correlation between said third and said predetermined digital words;

said threshold circuit means also being connected to receive said third comparison output signals and to produce its output signal in response to receipt of a predetermined minimum number of said comparison output signals.

37. A circuit as in claim 36 wherein:

said threshold circuit includes fast detect means for detecting the occurrence of a pair of said comparison output signals and responsive to receipt of a predetermined first number of substantially simultaneous pairs of said comparison output signals to provide said threshold circuit output.

38. A circuit as in claim 36 or 37 wherein:

said threshold circuit includes slow detect means for detecting the occurrence of a pair of said comparison output signals and responsive to receipt of a predetermined second number of said comparison output signals to provide said threshold circuit output.

39. A circuit as in claim 37 wherein:

said threshold circuit includes slow detect means for detecting the occurrence of a pair of said comparison output signals and responsive to receipt of a predetermined second number of said comparison output signals to provide said threshold circuit output, said second number being larger than said first number.

40. A circuit as in claim 39 wherein:

said slow detect means for enabling it to perform its stated function after said fast detect means has performed its stated function.

41. A circuit as in claim 39 or 40 wherein:

said slow detect means and said fast detect means are alternatively operable in response to a control input and wherein said threshold circuit includes a feedback connection from its threshold circuit output to said control input effective to thereby reduce the number of pairs of comparison output signals required to maintain said threshold circuit output after its initial occurrence.

42. A circuit as in claims 35, 36, 37, 39 or 40 wherein said comparisons of a digital word with said predetermined digital word occur at least at said predetermined nominal bit rate thereby providing said comparison output signals at said nominal bit rate so as to produce a faster overall circuit response.

43. A method for detecting a predetermined digital word of binary-valued bits within an incomimg serial bit stream, said method comprising:

comparing a sequence of binary-valued signals corresponding to a portion of said incoming serial bit stream with the bit values of said predetermined digital word, in a plurality of parallel processing channels, each channel providing a respectively corresponding independent successful comparison output in response to a predetermined detected degree of correlation between said compared binary values; and logically combining all said independent successful comparison outputs to produce a thresholded output in response to receipt of a predetermined number of said independent successful comparison outputs.

44. A method as in claim 43 wherein said logically combining step produces said thresholded output in response to receipt of a predetermined first number of pairs of comparison output signals.

45. A method as in claim 44 wherein each of said pairs of comparison output signals comprise such signals which occur substantially simultaneously from at least two of said comparison channels.

46. A method as in claim 44 wherein said logically combining step produces said thresholded output in response to receipt of a predetermined second number of comparison output signals.

47. A method as in claim 46 wherein said second number is greater than said first number.

48. A method as in claim 43, 44, 45, 46 or 47 wherein said logically combining step includes utilizing said thresholded output to change at least one of said predetermined numbers to a lower value in response to said thresholded output thereby reducing the number of comparison output signals required to maintain said thresholded output after its initial occurrence.

49. A method as in claim 43, 44, 45, 46 or 47 wherein each of said plural comparison steps includes performing said word comparison at least once each time another incoming bit is received.

50. A method as in claim 43, 44, 45, 46 or 47 wherein each of said plural comparison steps includes performing a number N of said word comparisons each time another incoming bit is received, N being at least equal to the number of bits in said predetermined digital word, and successive ones of the N word comparisons being performed after a relative shift in the bit-to-bit alignment between the words to be compared such that all possible sequences of bit values in said portion of the incoming bit stream are compared with said predetermined word between receipt of successive incoming bits.

51. A method for detecting a repeating predetermined digital word of binary valued bits within an incoming serial bit stream, said method comprising:
    comparing binary-valued signals corresponding to a word-length portion of said incoming bit stream with the bit values of said predetermined word to provide an output signal in response to a predetermined number of acceptable word comparisons, and
    utilizing said output signal to change said predetermined number to a lower value in response to the initial occurrence of said output signal thereby reducing the number of acceptable word comparisons required to maintain said output signal after its initial occurrence.

52. A method for detecting a repeating predetermined digitial word of binary-valued bits within an incoming serial bit stream, said method comprising:
    comparing binary-valued signals corresponding to a word-length portion of said incoming bit stream with the bit values of said predetermined word and to provide an output signal in response to a predetermined number of acceptable word comprisons,
    performing said comparisons at a rate which is approximately N-times higher than the bit-rate of incoming bits, N being at least equal to the number of bits in said predetermined word, and
    shifting the bits of one compared word relative to those of the other between successive ones of said word comparisons.

53. A method for reliably asynchronously detecting a repeating predetermined digital word of binary-valued bits within an incoming serial bit stream signal, said method comprising:
    receiving, in each of plural channels, a respectively corresponding relatively phase-shifted sequence of bit-stream signal samples,
    comparing said samples in each channel with the bits of said predetermined digital word, and providing, in each channel, respectively corresponding comparison outputs in response to a predetermined detected degree of correlation, and
    receiving said plural comparison outputs and producing a thresholded output in response to receipt of a predetermined number thereof.

54. A method for asynchronously detecting a predetermined squence of serially received binary-valued signals occurring at a predetermined nominal bit rate, said method comprising:
    sampling said signals at a first sequence of times and storing a first digital word of binary-valued bits representing a predetermined number of sampled values of said signals,
    comparing the binary-valued bits of said first digital word with a predetermined digital word of binary-valued bits,
    producing a first comparison output signal in response to a predetermined degree of detected correlation between said first and said predetermined digital words,
    sampling said signals at a second sequence of times different than said first sequence of times and storing a second digital word or binary-valued bits representing a predetermined number of sampled values of said signals,
    comparing the binary-valued bits of said second digital word with said predetermined digital word of binary-valued bits,
    producing a second comparison output signal in response to a predetermined degree of detected correlation between said second and said predetermined digital words, and
    combining said first and second comparison output signals to produce a thresholded output signal in response to receipt of a predetermined minimum number of said comparison output signals.

55. A method as in claim 54 further comprising:
    sampling said signals at a third sequence of times different than said first and second sequences of times and storing a third digital word of binary-valued bits representing a predetermined number of sampled values of said signals,
    comparing the binary-valued bits of said third digital word with said predetermined digital word of binary-valued bits,
    producing a third comparison output signal in response to a predetermined degree of detected correlation between said third and said predetermined digital words,
    said combining step also operating upon said third comparison output signals to produce the thresholded output signal in response to receipt of a predetermined minimum number of said comparison output signals.

56. A circuit as in claim 55 wherein:
    said combining step responds to receipt of a predetermined first number of substantially simultaneous pairs of said comparison output signals to provide said thresholded output.

57. A circuit as in claim 55 or 56 wherein:
    said combining step responds to receipt of a predetermined second number of said comparison output signals to provide said thresholded output.

58. A method as in claim 56 wherein:
    said combining step responds to receipt of a predetermined second number of said comparison output signals to provide said thresholded output,
    said second number being larger than said first number.

59. A method as in claim 58 wherein:
    said combining step includes feeding back said thresholded output to change said second number to a lower value in response to said thresholded output thereby reducing the number of comparison output signals required to maintain said thresholded output after its occurrence.

60. A method as in claims 54, 55, 56, 58 or 59 wherein said comparisons of a digital word with said predetermined digital word occur at least at said predetermined nominal bit rate thereby providing said comparison output signals at said nominal bit rate so as to produce a faster overall circuit response.

61. A coincidence detector for bit sequences wherein an incoming bit sequence having a predetermined nominal bit rate is compared with a reference bit sequence, said detector comprising:
- a plurality of binary bit samplers, each having respective individual inputs connected in parallel with the incoming bit sequence and each providing an output representing the binary value of the input bit sequence at a succession of sampling times defined by a sampler control signal input thereto,
- a source of phase displaced sampler control signals recurring at a frequency approximating said nominal bit rate having respective plural phase displaced outputs, each being connected with a respective one of said sampler control signal input,
- plural bit storage registers, each register being connected with the respective output of a corresponding one of said samplers for storing a succession of output signal values from its respectively corresponding sampler,
- plural comparators each having a first input connected to receive the the sequentially shifted outputs of a respectively corresponding one of said bit storage devices, each comparator also having a second input for receiving a sequence of reference signals to be synchronously compared to the sequence of signals presented to said first input and each comparator also having an output providing an output signal after a predetermined number of successive favorable bit comparisons,
- reference bit sequence source apparatus connected with said second inputs to said comparators,
- plural coincidence indication storage latch devices, each being connected with a respective output of said comparators, and
- control output signal generating apparatus connected with said coincidence indication storage latch devices for generating a predetermined signal in response to a predetermined logical combination of the contents of said plural coincidence indication storage latch devices.

62. A coincidence detector according to claim 61 wherein said source of phase displaced sampler control signals includes means for producing "P" differently phased outputs, where "P" is an odd number, and said control output signal generating apparatus includes means for emitting a signal in response to the presence of favorable coincidence indications stored in a majority of said coincidence indication storage latch devices.

63. A coincidence detector according to claim 62 wherein said reference bit sequence source apparatus includes separate source means individually associated with each comparator.

64. A coincidence detector according to claim 61 wherein said bit storage registers are shift registers.

65. A coincidence detector according to claim 64 wherein the shift register loop has a capacity of "N" bits.

66. A coincidence detector according to either claim 64 or 65 wherein there is a control bit sequence generator connected with each phase displaced output of said sampler control signal source and said control bit sequence generator produces in response to each sampler control signal a control bit sequence having at least "N" bits where "N" is the length of the analyzed bit sequence, at a bit rate substantially greater than the nominal bit rate of the analyzed bit sequence, and said control bit sequences drive the respective associated shift registers.

67. A coincidence detector according to claim 66 wherein said control bit sequence generators include means for producing a pulse group having "N"×(N+1) pulses in response to each sampler control signal where "N" is the number of bits in an analyzed bit sequence.

68. A coincidence detector according to claim 67 wherein said control bit sequence generators include means for suppressing each (N+1)th pulse in the control pulse train driving the shift registers.

69. A coincidence detector according to claim 68 wherein said control bit sequence generators each produce a (N+1)th pulse in the control bit sequence which is connected to re-set a corresponding comparator.

70. A concidence detector according to claim 69 wherein each coincidence indication storage latch device is connected to be re-set by the sampler control signals input to its respectively corresponding sampler.

71. A coincidence detector according to claim 61, 62, 63, 64 or 65 wherein the control output signal generating apparatus includes:
- "P" AND gates each with (P−1) inputs, where "P" is the number of differently phased sample control signals,
- an OR gate connecting the outputs of said AND gates to an output counter and
- a numerical threshold device connected between said output counter and a control output signal line.

72. A coincidence detector according to claim 71 wherein said numerical threshold device delivers a signal when the count in the associated output counter has a predetermined value greater than 1 and less than "N" where "N" is the number of bits in the analyzed bit train.

73. A coincidence detector according to claim 61, 62, 63, 64 or 65 wherein the control output signal generating apparatus includes:
- AND gates having a first set of inputs fed from each different one of the coincidence indication storage latch devices and another second set of inputs fed with the corresponding phase sampler control signals,
- an OR gate connecting the outputs of said AND gates to an output counter, and
- a numerical threshold device connected between the output of said output counter and a control output signal line said threshold device delivering a signal to said control output signal line when the count in said output counter exceeds a predetermined numerical value M greater than 1 and less than "N" where N is the number of bits in the analyzed bit sample.

74. A coincidence detector according to claim 73 wherein said threshold device is settable to function at different predetermined numerical values M and M' where M' is less than M.

75. A coincidence detector according to claim 74 wherein said output control signal line feeds a signal maintaining delay circuit, the numerical threshold of said settable numerical threshold device normally being at the higher threshold level M, and the appearance of a signal at the output of said signal maintaining delay circuit being effective to reduce the numerical value for actuation of said threshold device to a lower value M'.

76. A coincidence detector is accordance with claim 75 wherein the output lines from said numerical threshold devices are connected through an OR gate with the input to said signal maintaining delay circuit.

* * * * *